Figure 1:
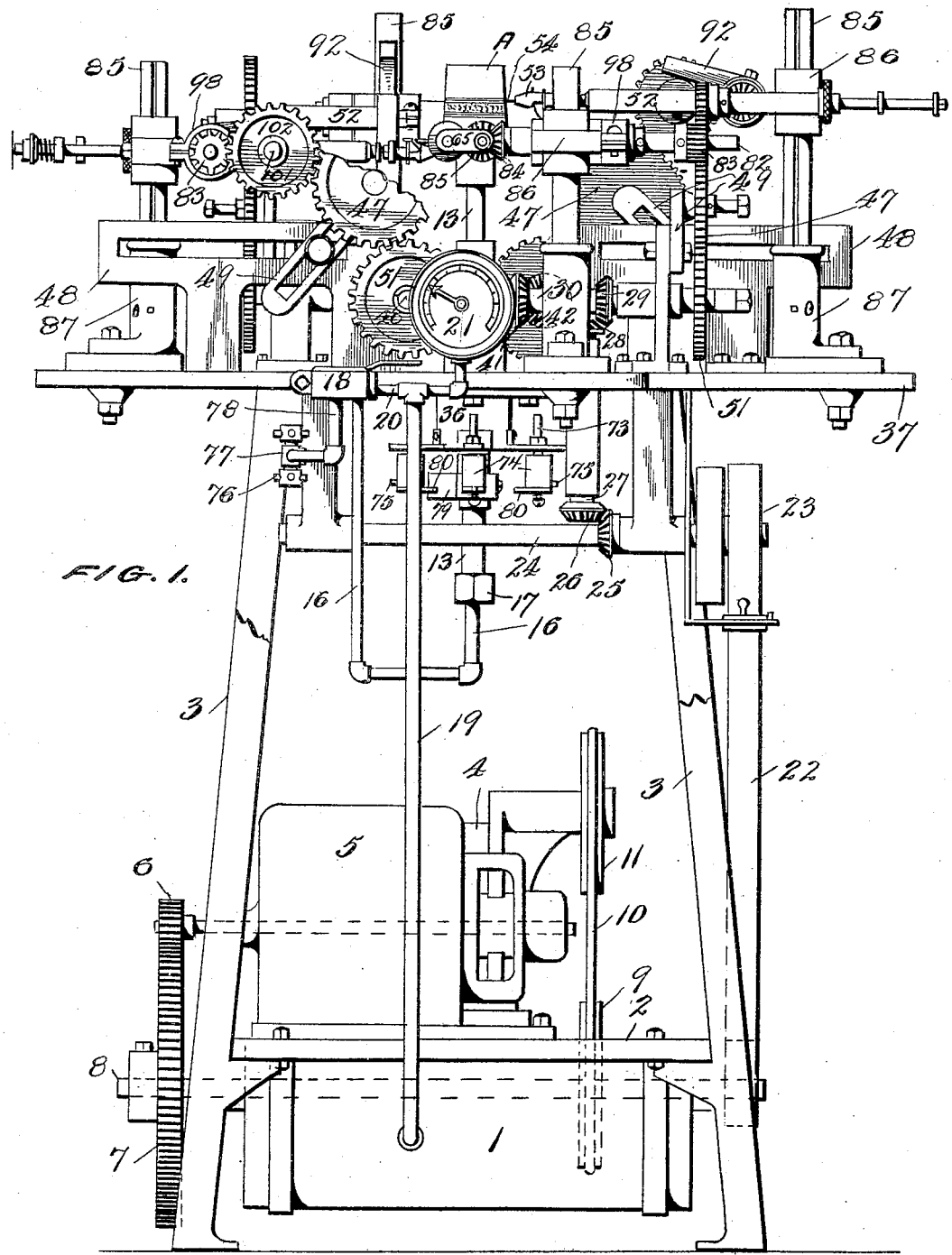

A. B. KNIGHT.
GLASS ETCHING MACHINE.
APPLICATION FILED MAY 6, 1909.

941,883.

Patented Nov. 30, 1909.

4 SHEETS—SHEET 1.

WITNESSES
Chas. K. Davis.
H. D. Smith

A. B. Knight INVENTOR
C. L. Parker
Attorney

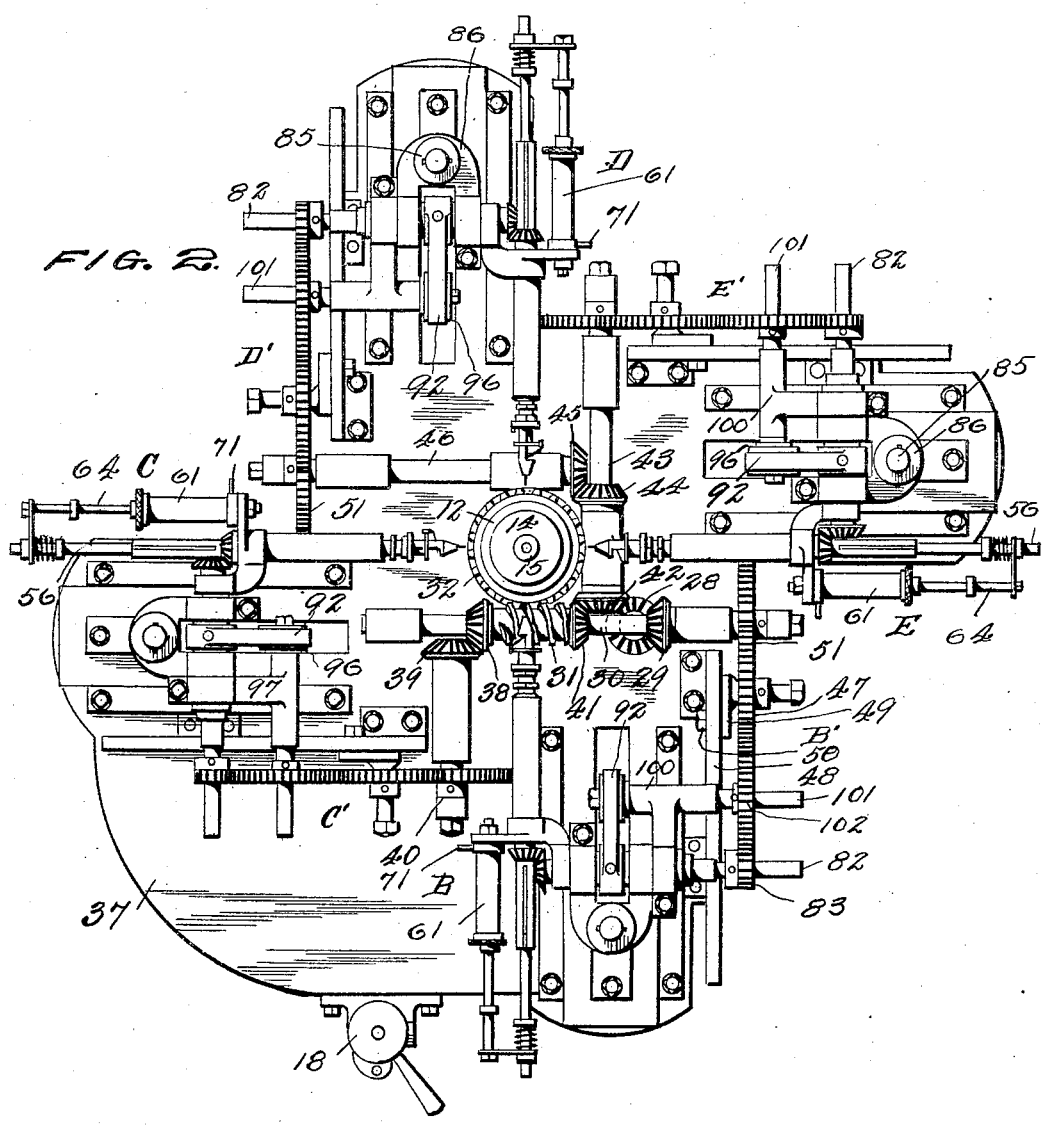

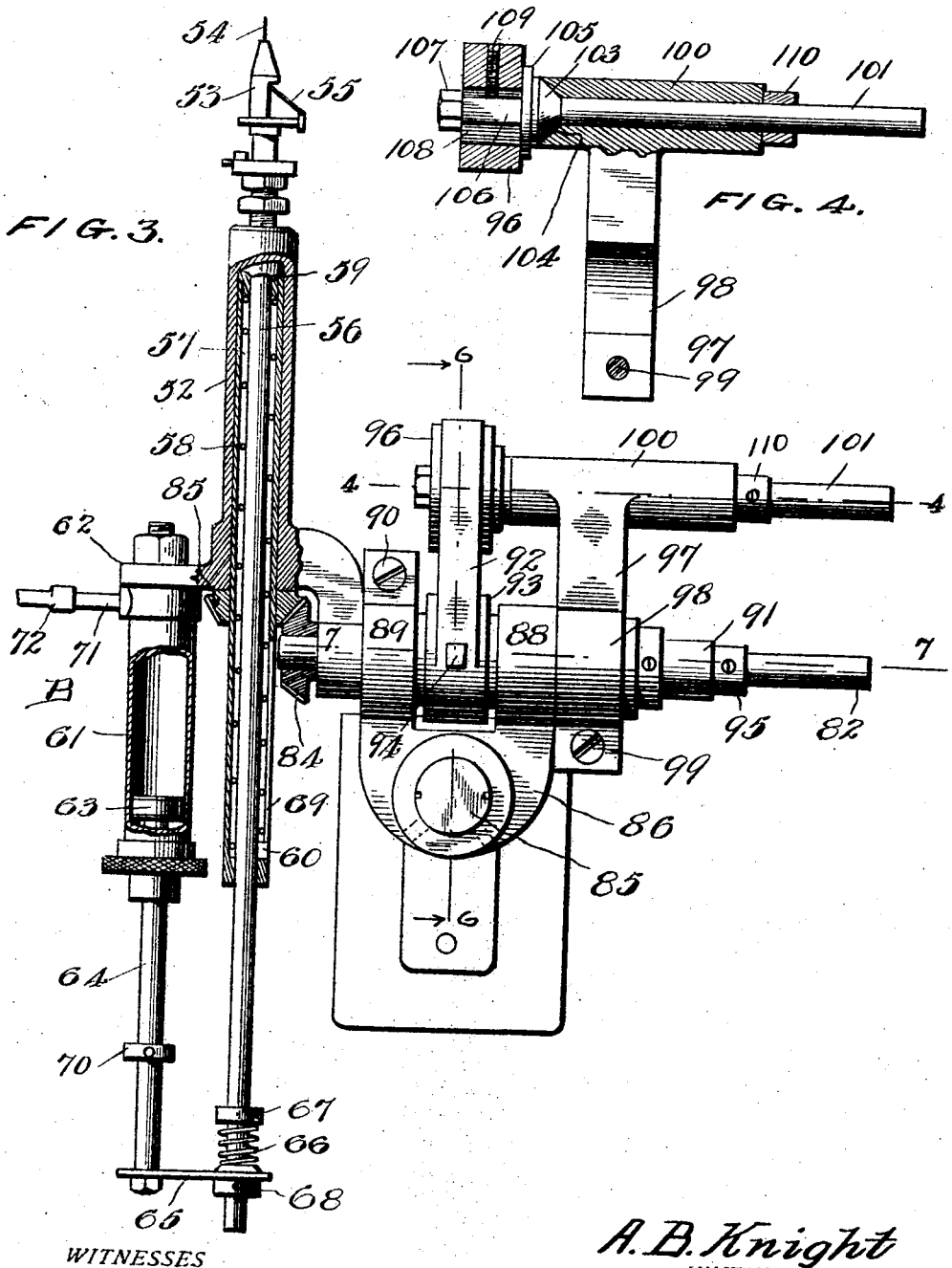

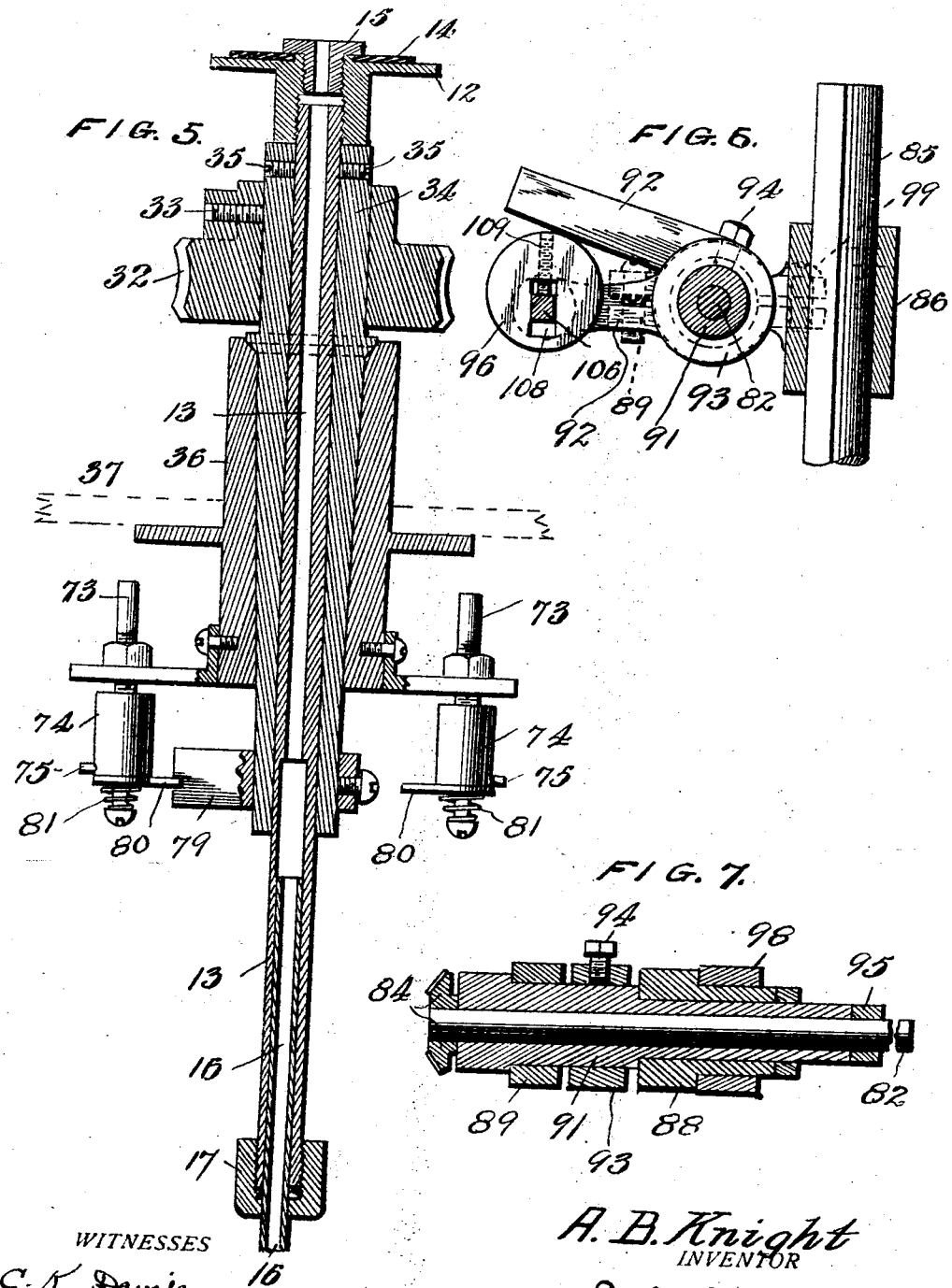

UNITED STATES PATENT OFFICE.

ALBERT B. KNIGHT, OF FAIRMONT, WEST VIRGINIA.

GLASS-ETCHING MACHINE.

941,883.

Specification of Letters Patent. Patented Nov. 30, 1909.

Application filed May 6, 1909. Serial No. 494,358.

*To all whom it may concern:*

Be it known that I, ALBERT B. KNIGHT, a citizen of the United States, residing at Fairmont, in the county of Marion and State of West Virginia, have invented certain new and useful Improvements in Glass-Etching Machines, of which the following is a specification.

The present invention relates to improvements in engraving machines, and especially to that class adapted for etching or incising ornamental designs in the wax or other coating substance which is usually applied to glass ware for this purpose.

The broad principles of the invention, and some of the details thereof are disclosed in Patent No. 912,386, glass etching machine, issued to me and bearing date of February 16, 1909, and reference should be had thereto for details of some of the elements and constructions of the present case.

The invention in its improved physical embodiment includes a series of etching devices, each of which, in addition to its adaptability to perform the functions of a stationary incisor, is capable of a rotary and an oscillating movement, in order to adapt any or all of the devices of the series, to different characters of work. Thus it is possible to engrave or etch parallel or other border lines, and also different designs in scroll work for body ornamentation of a glass vessel, by adjusting the devices as desired. And the reciprocatory movement of the devices permits their automatic withdrawal from the work to allow the passage of a handle or other obstruction on the glass ware. The "work" or article to be etched, is held to its support by suction from a vacuum tank, and the incising points or needles for etching are also pneumatically held to their work; in this manner the machine is easily and simply manipulated.

A novel construction is disclosed in the present means for independently oscillating the needles or incising points in the plane of their work, by the use of adjustable cams and connections, in order to elevate and depress the needles in the performance of their work, to fashion predetermined figures or designs, such as scrolls, which will eventually appear on the glass ware.

Further novel features of construction and combinations and arrangements of parts will be apparent, and the drawings disclose the best mode I have so far devised for the physical embodiment of the invention.

In the drawings: Figure 1 is a side elevation of a machine embodying my improvements, parts being broken away for convenience of illustration. Fig. 2 is a top plan view of Fig. 1. Fig. 3 is an enlarged plan view of one of a series of similar etching devices, parts being shown in section, and also showing the means for imparting an oscillatory motion to the needles. Fig. 4 is a sectional view on line 4—4 of Fig. 3. Fig. 5 is a vertical sectional view of parts at the center of the machine, showing the work support and connections. Fig. 6 is a sectional view on line 6—6 Fig. 3, and Fig. 7 is a sectional view at line 7—7 Fig. 3.

The vacuum tank 1, from which parts of the machine are pneumatically actuated is supported from the bed plate 2 of the machine frame 3, and air is exhausted therefrom by the pump 4. Power is supplied to the pump by the electric motor 5 through gears 6 and 7, the latter journaled on shaft 8 which carries the driving pulley 9, and pulley 9 is connected by belt 10 to the driven pulley 11, which is directly connected to and operates the pump.

When the machine is in operation, the "work" or article to be etched, which may be a glass tumbler A, is rotated, and the engraving or etching devices are held in predetermined adjusted relation thereto. Thus, the tumbler A is held by suction upon the table or support 12, which is rotatable, and is secured by screw threads at the upper end of vertical hollow shaft or tube 13, the tumbler being supported in air tight manner directly upon the packing 14 which is clamped to the table by the perforated nut 15. The bore at the lower end of the tube 13 is enlarged to permit the telescopic connection of the air pipe 16, the joint therebetween being closed by a packing collar 17.

A manually operated regulator 18 is interposed between the pipe 16 and vacuum tank 1, connection between the regulator and tank being had through the pipe 19 and short pipe 20, and a pressure indicator 21 is utilized to indicate the condition of the vacuum in the tank.

The details of construction and operation of the regulator 18 are clearly set forth in my patent above referred to, and further description is unnecessary, except to state that the operation of the machine is pneumatically controlled by manual actuation of this device. By means of the regulator communication is initially established between the vacuum tank and the tumbler as above described to hold the tumbler in position to be operated on, then a continued movement of the regulator pneumatically advances the etching devices to their work. When the vacuum is relieved by the regulator, the etching devices are first rendered inoperative by retraction, and then the tumbler is released.

While the tumbler is being securely held by suction upon the table 12 it is rotated, and this rotary motion is imparted thereto from the driven shaft 8 (Fig. 1) through belt 22, tight pulley 23 and shaft 24, bevel gears 25 and 26, vertical shaft 27, bevel gears 28, 29, horizontal shaft 30, worm 31 (Fig. 2) and worm wheel 32.

The worm wheel 32 is secured as by screw 33 to the journal sleeve 34 (Fig. 5) which incases the hollow shaft 13 and may be adjustably secured thereon by set screws 35, in order to raise or lower the table 12 to adapt the machine for different sizes and character of work. The journal sleeve 34 is rotatably supported in the bearing sleeve 36 which is rigidly secured to the bed plate 37 of the machine, and provides a tapered bearing complementary to the journal 34.

In Figs. 1 and 2 I have illustrated a series of four etching devices, designated as B, C, D, and E, each capable of an oscillatory movement, and their respective needles of an additional rotary and longitudinally reciprocating movement. The rotary and oscillating motions are actuated mechanically, and the reciprocating motion is accomplished pneumatically, the first two motions being provided indirectly through means of the horizontal shaft 30, which is driven as heretofore described.

The rotary and oscillating motion of the etching devices are actuated through individual sets of gear wheels: the set B′ directly from shaft 30; C′ from shaft 30, bevel gears 38 and 39 and shaft 40; D′ from shaft 30, bevel gears 41 and 42, shaft 43, bevel gears 44 and 45 and shaft 46; and set E′ direct from shaft 43. One of the gears 47 of each set is an idle wheel, supported from the fixed slotted frame 48 by means of the adjustable slotted bracket 49 and nut 50. This construction permits the use of different sized idle wheels to increase or diminish the speed of the train of gears to suit varying conditions, and each train of gears is actuated from the master wheel 51, which meshes with the idle wheel 47.

The construction and operation of each of the etching devices being identical, the description of one will suffice for the remainder of the series. To this end attention is called to Fig. 3, which is an enlarged view of the device designated by the letter B in Fig. 2.

The engraving or etching device comprises a cylindrical carrier 52 provided with a head 53 which is adapted to hold one or more needles or incising points 54 urged outwardly by springs 55. The head 53 is carried on a rod 56 which is movable longitudinally within the stationary tube or sleeve 57 and said rod is urged in one direction away from the work by a spring 58 interposed between abutments 59 and 60. The forward movement of the rod and needle is produced pneumatically, and for this purpose a cylinder 61 is mounted in a suitable position and attached to a projection 62 integral with the carrier 52. This chamber contains a piston 63, the rod 64 of which is connected with rod 56 by cross arm 65, whereby reciprocatory motion of either the needle carrier or the piston is transmitted from one to the other.

The piston head is subjected to a suctional force which moves it, and through the described connection advances the needle to working position. This suctional force is created by producing a vacuum in the cylinder 61 from regulator 18, as will be described.

The rod 56 in its advancing movement draws the spring 58 under tension sufficient to restore said rod and piston to their retracted positions when the vacuum in cylinder 61 is relieved. A cushioning spring 66 is located on rod 56 between a fixed collar 67 and holding device 68, and a guide groove 69 in the sleeve 57 locks the rod 56 and sleeve 57 against independent rotary movement.

The adjustable collar 70 on piston rod 64 limits the forward movement of the piston in cylinder 61. Each cylinder 61 is provided with a nipple 71 to which the air hose 72 is attached, and the other end of this hose is connected to the nipple 73 of a valve casing 74. Each valve casing 74 has a nipple 75 connected by a suitable hose each to one of the nipples 76 on the valvular member 77, and this member 77 is connected by pipe 78 to the regulator 18, which latter is connected as described with the vacuum tank 1.

By means of the manually operated regulator 18 each needle or incising point may be independently retracted from operative position to clear handles or other obstructions on the glass ware, by connecting each cylinder 61 with a respective valve 74, through the medium of which the piston chamber 61 is opened to the atmosphere in valve 74, to relieve the vacuum, and permit the spring 58 to withdraw the needle from its work.

The general arrangement of these valves is illustrated in Figs. 1 and 5 of the drawings, but the specific details of construction are shown and described in my patent above referred to. The valves are actuated by contact with a passing rotary cam 79 secured on the sleeve 34, which cam strikes the lever 80 of the valves, by the movement of which the vacuum is released in the cylinder 61. The cam is adjustable on the sleeve so that it may be turned to correspond with the position of the projection on the work in order to retract the needle to allow the projection to pass. The lever is automatically returned to its original position by a spring 81 after the cam is disengaged therefrom, and the needle is again advanced to position by the restored suction. The cam acts successively on the several valve levers as it rotates, thus withdrawing each needle at a predetermined instant.

The rotary motion of the needle is accomplished through the medium of shaft 82 and gear wheel 83 of each train. A bevel gear 84 is fixed on shaft 82 at the end remote from wheel 83, and this wheel 84 meshes with and rotates a second bevel wheel 85 fixed on the tube or sleeve 57. The rotation of the needle is thus secured through the abutment 60 in slot 69 of sleeve 57, and rod 56 carrying the needle.

The oscillatory motion of the needle and carrier is imparted thereto in connection with shaft 82 as a pivot or rock shaft.

As clearly seen in Figs. 3 and 6 each etching device is suspended upon a post 85 by means of the yoke 86. The post is adjustably supported in bracket 87 which is in turn adjustable on the bed plate 37. The yoke 85 is formed with an integral bearing sleeve 88 and a split sleeve 89 which latter may be clamped by screw 90 upon the angular extension 91 of the carrier 52. A rocker arm or cam lever 92 fashioned with a sleeve 93 is secured by set screw 94 to the tubular extension 91, and moves with said extension, the parts rocking upon shaft 82 and being held against lateral movement by set collar 95. The cam block 96 which rocks the device is a circular disk and is supported from the sleeve 88 of yoke 86 by bracket arm 97 which arm has a split sleeve 98 clamped around the sleeve 88 by set screw 99. The outer end of the bracket 97 is formed with a sleeve 100 to accommodate the shaft 101 which is rotated by the wheel 102. As clearly shown in Fig. 4 the shaft 101 has an integral tapered bearing head 103 seated in a complementary recess 104 of the bearing sleeve 100; an enlarged integral disk 105; and an angular extension 106, whose end is reduced and threaded for the clamp nut 107. The angular extension 106 is fitted within the angular slot 108 in the cam piece 96, and as clearly seen in Fig. 6 this slot is located off center in the cam block or wheel. A cam action within limits is thus secured by moving the extension 106 the desired distance from the center of the cam wheel 96, and clamping the wheel in place by means of the nut 107. The cam may be forced off center by turning the screw 109 as will be understood. A set collar 110 is employed to prevent lateral motion of bracket sleeve 100 on shaft 101.

From this construction it is evident that with the rotation of shaft 101 through its gear the wheel 96 is rotated as a cam with rocker arm or cam lever 92 in contact therewith. The rotary motion of the cam is imparted to the lever which rocks the extension 91 and needle carrier 52, causing the needles to be elevated and depressed in unison with the motion of the cam. This oscillating motion causes the needles, which are constantly in contact with the tumbler, to etch or engrave, in the vertical plane of the work or tumbler, predetermined figures, designs or scroll work as the tumbler rotates. And the combined rotary and oscillatory movement of the needles permits an almost unlimited variety of etching lines to be performed by the devices.

From the above description taken in connection with the drawings it is evident that I have produced a machine which fulfils the conditions set forth as the object of my invention.

Having thus fully described my invention, what I claim as new and desire to secure by Letters Patent is:

1. The combination in an etching device comprising an oscillatory carrier and incising points, of an extension on the carrier suitably supported, a cam lever on said extension, and a suitably actuated cam for rocking said lever to oscillate the incising points.

2. The combination in an etching device comprising an oscillatory carrier and incising points, of an extension on the carrier suitably supported, a cam lever on said extension, and a suitably actuated adjustable cam for rocking said lever to oscillate the incising points.

3. The combination with a carrier and its incising points and an extension on the carrier, a cam lever on said extension, a rotary shaft having an angular extension, a slotted cam block on said extension, and means for rotating said shaft to oscillate the incising points as described.

4. The combination with an etching device having a tubular extension and a shaft therein, a rocker arm on the extension, a rotary shaft having an angular extension, a slotted cam block adjustable on the extension and engaging the rocker arm, and means for rotating the second shaft to oscillate the etching device.

In testimony whereof I affix my signature in presence of two witnesses.

ALBERT B. KNIGHT.

Witnesses:
 TUSCA MORRIS,
 C. R. SHEUR.